United States Patent [19]

Kemper

[11] Patent Number: 4,778,831
[45] Date of Patent: Oct. 18, 1988

[54] SEALING COMPOUNDS, THE PREPARATION THEREOF, AND USE OF SAME

[75] Inventor: Heinz B. Kemper, Kassel-Wilhelmshöhe, Fed. Rep. of Germany

[73] Assignee: Kunststoff- & Lackfabrik Kemper, Vellmar/Obervellmar, Fed. Rep. of Germany

[21] Appl. No.: 725,375

[22] Filed: Apr. 22, 1985

[30] Foreign Application Priority Data

May 9, 1984 [EP] European Pat. Off. ........ 84105270.7

[51] Int. Cl.$^4$ ........................... C08K 5/07; C08K 5/49; C08L 67/06; C08L 73/04
[52] U.S. Cl. ......................................... 522/18; 522/42; 522/64; 522/93; 522/106; 522/107; 522/108; 525/20; 525/21; 525/28; 525/43; 525/171
[58] Field of Search ................... 522/93, 106, 107, 18, 522/64, 42, 108; 525/20, 21, 28

[56] References Cited

U.S. PATENT DOCUMENTS

| | | | |
|---|---|---|---|
| 3,677,920 | 7/1972 | Kai et al. | 522/106 |
| 3,904,796 | 9/1975 | Zorn et al. | 427/390 |
| 4,265,723 | 5/1981 | Hesse et al. | 522/64 |
| 4,425,287 | 1/1984 | Hesse et al. | 522/64 |

*Primary Examiner*—Allan M. Lieberman
*Attorney, Agent, or Firm*—Kane, Dalsimer, Sullivan, Kurucz, Levy, Eisele & Richard

[57] ABSTRACT

The invention relates to a sealing compound which contains unsaturated polyester resins, crosslinking agents, light initiators, and elasticity-modifying agents as well as, optionally, adjuvants, pigments, and/or dyes. The invention also relates to a method for the production of the sealing compound and to its use on or in building structures.

7 Claims, No Drawings

SEALING COMPOUNDS, THE PREPARATION THEREOF, AND USE OF SAME

FIELD OF THE INVENTION

This invention relates to novel sealing compounds. More particularly, this invention relates to sealing compounds containing crosslinking agents, the preparation of such sealing compounds, and the use of such sealing compounds.

BACKGROUND OF THE INVENTION

Sealing compounds, that is, sealants, are often exposed to greatly fluctuating influences. Primarily light, temperature, and moisture, singly or in combination, may impair the effectiveness of sealants or even make them unusable. Attempts have been made, therefore, to develop sealants which largely meet desired requirements for stability and effectiveness. However, known proposals for solutions are not entirely satisfactory.

Thus, there has been a need to develop a sealant which is effective at high as well as at low temperatures, under the action of moisture or dryness, and under strong solar radiation, and which is, moreover, safe for those employed to apply to install the sealant. Lastly, the sealant is to be ecologically acceptable, that is, contain or give off no substances that adversely affect the environment or the immediate surroundings.

OBJECTS OF THE INVENTION

It is an object of the invention to provide novel sealants.

It is also an object of the invention to provide a process for preparing said sealants and a process for using them.

It is a further object of the invention to provide sealants which are effective at high or low temperatures, under moist or dry conditions, and under strong solar radiation and which are toxicologically harmless and ecologically acceptable.

These and other objects of the invention will become more apparent in the discussion below.

DETAILED DESCRIPTION OF THE INVENTION

According to Applicants' invention, novel sealants having desired characteristics have been provided. The sealants are characterized by the following contents:
(a) unsaturated polyester resins and monomers polymerizable therewith, as crosslinking agent;
(b) light initiators;
(c) elasticity-modifying agents; and, optionally,
(d) adjuvants and/or pigments and/or dyes.

The sealant obtainable from a mixture of the components (a), b), and (c) and optionally (d) is distinguished primarily by the fact that it contains no solvent which could adversely affect the environment and/or immediate surroundings. The liquid mixture is easy and safe to apply at a site and hardens in a very short time even in diffused daylight. The fully hardened sealant shows very good resistance to cold and has good breaking strength; hence, it is still very elastic at low temperatures, does not become brittle, and adheres firmly to substrates.

Suitable unsaturated polyester resins of component (a) comprise known unsaturated polycondensation products, preferably of dicarboxylic acids and glycols. Dicarboxylic acids or their esterifiable derivatives, in particular their anhydrides, may be used. In the unsaturated polyester resins the unsaturation may reside either in the dicarboxylic acid component or in the diol component, but preferably in the former.

As olefinically unsaturated dicarboxylic acids, preferably maleic acid, maleic acid anhydride, fumaric acid, chloromaleic acid, itaconic acid, or citraconic acid are used, while as "saturated" dicarboxylic acids, so to speak, phthalic acid, phthalic acid anhydride, isophthalic acid, terephthalic acid, succinic acid, adipic acid, sebacic acid, or pimelic acid are used. The ratio of saturated to unsaturated dicarboxylic acids is preferably from about 5:1 to 5:10.

Useful glycols preferably comprise ethylene glycol, propylene glycol, 1,3-butylene glycol, butenediol-1,4, and especially, neopentyl glycol.

For the preparation of the unsaturated polyester resins, the conventional, known methods may be used, the esterification reaction preferably being conducted so that the unsaturated polyester resins have acid numbers of from about 15 to 30. Preferably liquid polyester resins are employed, but solid polyester resins may also be used if they are soluble in the quantity of crosslinking agent to be used also.

Suitable monomers polymerizable with the above-named polyester resins which serve as crosslinking agents in the unsaturated polyester resins comprise aromatic and/or aliphatic vinyl compounds, in particular, styrene, α-methyl styrene, p-chlorostyrene, vinyl toluenes divinyl benzene, methacrylic acid methyl ester, methacrylic acid n-butyl ester, acrylic acid tertiary butyl ester, the reaction product of caprolactone and acrylic acid, as well as phthalic acid diallyl ester.

If the sealants are to have a greater hardness, it is preferred that di- or tri-functional acrylic or methacrylic acid compounds, such as hexane diolacrylate, trimethylol propane triacrylate, tripropylene glycol diacrylate, or triethylene glycol dimethacrylate, be used as crosslinking agents.

The aromatic and/or aliphatic vinyl compounds are present in a quantity of from about 25 to 75 percent by weight, preferably from about 30 to 65 percent by weight, based upon the weight of the unsaturated polyester resins. These compounds can be used singly or in mixtures. Especially preferred as crosslinking agents are styrene and vinyl toluene.

The viscosity of component (a) is preferably in the range of from about 900 to 2500 cP.

Of special importance are the light initiators of component (b), as they are to lead to non-yellowing products in the crosslinking reaction between the unsaturated polyester resins and the monomers polymerizable therewith. For this, it is suitable to use 2-hydroxy-2-methyl-1-phenyl-propan-1-one, which is preferred, or one or more acyl phosphinoxide compounds of the formula

in which
$R^1$ represents a linear or branched alkyl group having from 1 to 6 carbon atoms, a cyclohexyl-, cyclopentyl-, aryl-, halogen-, alkyl-, or alkoxy-substituted aryl group having a total of from 6 to 12 carbon atoms, or an S- or N-containing five- or six-membered heterocyclic radical otherwise containing carbon atoms;

$R^2$ has the meaning of $R^1$, where $R^1$ and $R^2$ may be identical or different, or represents an alkoxy group having from 1 to 6 carbon atoms or an aryloxy or arylalkoxy group having a total of from 6 to 12 carbon atoms, or $R^1$ and $R^2$ together with the phosphorus atom to which they are attached form a cyclic moiety having from 2 to 12 carbon atoms; and $R^3$ represents a linear or branched alkyl group having from 2 to 18 carbon atoms, a cycloaliphatic radical having from 3 to 10 carbon atoms, a phenyl or naphthyl group, or an S-, O-, or N-containing five- or six-membered heterocyclic group otherwise containing carbon atoms, the $R^3$ group having one or more substituents, or the group

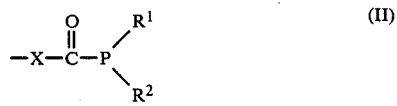

(II)

wherein $R^1$ and $R^2$ are as defined above and X represents a phenylene group or an aliphatic or cycloaliphatic bivalent group having from 2 to 6 carbon atoms, with the proviso that one or more of $R^1$ to $R^3$ may be olefinically unsaturated.

The acyl phosphinoxide compounds of Formula I are known from European Patent No. 0,007,086, incorporated herein by reference.

With regard to the polymerization lacquers according to the invention, the following acyl phosphinoxide compounds have been found to be especially preferred:

2,4,6-trimethylbenzoyl-diphenyl phosphinoxide,
2,6-dimethoxybenzoyl-diphenyl phosphinoxide,
2,6-dichlorobenzoyl-diphenyl phosphinoxide,
2,3,5,6-tetramethylbenzoyl-diphenyl phosphinoxide, and
2,4,6-trimethylbenzoyl-phenyl phosphinic acid methyl ester.

Also, mixtures of the above-mentioned light initiators may be used. For example, from 2 to 8 of said light initiators may be used in admixture.

If desired, other known light initiators such as benzil dialkyl ketals, in particular, benzil dimethyl ketal, or mixtures thereof, may also be used together with the aforesaid light initiators. However, such light initiators may be additionally used only in such a quantity that the weight ratio of 2-hydroxy-2-methyl-1-phenyl-propan-1-one and/or acyl phosphinoxide compound to the aditional light initiators is at most 3:1. If the known, additional light initiators are present in a higher quantity, yellowing of the sealing compound may occur.

The weight ratio of component (a) to component (b) is from about 100:0.5 to 100:5.

Useful elasticity-modifying agents, that is, plasticizers, of component (c) primarily comprise polyurethanes, butadiene-styrene copolymers, and reaction products of polyurethanes comprising free isocyanate groups with polybutadienes comprising hydroxyl groups. Based upon the weight of component (a), the polyurethanes are used in a quantity of from about 4 to 45 percent by weight, preferably from about 20 to 30 percent by weight; the butadiene-styrene copolymers are used in a quantity of from about 4 to 12 percent by weight, preferably from about 6 to 7 percent by weight; and the reaction products of polyurethanes comprising free isocyanate groups with polybutadienes comprising hydroxyl groups are used in a quantity of from about 5 to 15 percent by weight, preferably from about 8 to 12 percent by weight.

The polyurethanes preferably have a molecular weight of from about 2000 to 4000 (as determined by the reaction of the starting materials) and are either liquid or soluble in the crosslinking agent. They are based upon aliphatic or aromatic di- and tri-isocyanates, such as toluylene-2,4-diisocyanate, toluylene-2,6-diisocyanate, or their mixtures; single diphenylmethane diisocyanates or their mixtures; isophorone diisocyanate; trimethyl-hexamethylene diisocyanate; or an adduct of m- or p-tetramethylxylene diisocyanate to trimethylol propane, a long-chain polyol (with at least 5 carbon atoms), and/or polyether polyol. The polyurethanes are prepared in the usual manner, optionally in the presence of a reaction accelerator, with formation of prepolymers comprising free isocyanate groups. Subsequently, the prepolymers are reacted with an amine, polyamine, polyol, polyether polyol, and/or caprolactone acrylate, to saturation. In this regard it has proven especially appropriate to add the amine and/or the polyamine dissolved in the crosslinking agent when reacting the prepolymers, to avoid gel formation.

It is essential that the polyurethanes should contain no free isocyanate groups before they are brought together with the unsaturated polyester resins and with the crosslinking agent, because the free isocyanate groups would react with the unsaturated polyester resins. Longer chains would then form which tend to solidify and be barely soluble or soluble only with great difficulty in the quantity of crosslinking agent to be used. With polyester resins lengthened in the chain, it is not possible to obtain sealants according to the invention having the desired elasticity property.

Dependent upon the quantity of the polyurethanes in the sealant according to the invention, one can achieve an elongation improved by from about 40 to 300 percent, which is not lost even at temperatures down to −35° C.

The same results can be obtained with butadiene-styrene copolymers and/or with reaction products of a polyurethane comprising free isocyanate groups with polybutadiene comprising hydroxyl groups. According to an especially preferred form of the invention, mixtures of polyurethane and butadiene-styrene copolymers are employed to further increase the rupture elongation and cold stability.

Optionally the sealants according to the invention may also contain adjuvants and/or pigments and/or dyes previously known in the art. Useful adjuvants comprise anti-settling agents, skin-forming agents, dulling agents, thickening agents (thixotropic agents), light-conducting fillers, wetting agents, deaeration agents, leveling agents, and flame retardant agents. Such adjuvants may be present, in total, in a quantity up to about 30 percent by weight, that is, from about 0.1 to 30 percent by weight, based upon the weight of the components (a), (b), and (c).

Dehydrated castor oil, bentonites, and highly dispersed silicic acid have proven advantageous as anti-settling agents. Highly dispersed silicic acid is especially preferred because it also functions at the same time as a dulling and thickening agent. It is employed in a quantity of from about 1 to 4 percent by weight, based upon the weight of component (a), while the other anti-settling agents may be present in quantities of from about 0.5 to 4.5 percent by weight, based upon the weight of component (a).

Useful skin-forming agents comprise waxes, paraffins—preferably having a melting point of from about 46° to 72° C.—as well as polyethylene waxes, in quantities of from about 0.05 to 4 percent by weight, based upon the weight of component (a).

In addition to highly dispersed silicic acid, magnesium oxide powder or magnesium stearate, which may serve at the same time as a dulling and anti-settling agent, may be used. These compounds would be used in quantities of from about 0.5 to 4.5 percent by weight, based upon the weight of component (a).

Preferred examples for light-conducting fillers are feldspar and talcum, preferably substantially free from iron and other heavy-metal compounds, as well as quartz powder, glass powder, glassfiber powder of a staple length below about 0.5 mm and a fiber diameter of from about 0.6 to 10 $\mu$m, aluminum hydroxide, preferably in powder form, aluminosilicate powder, or borosilicate glass powder. Preferably the talcum comprises a magnesium silicate with about 61% $SiO_2$, 31% MgO, 1 to 5 percent $Al_2O_3$, and 1 to 5 percent $H_2O$. The quartz powder preferably consists of 99.5% $SiO_2$. Suitable glass powder and glassfiber powder are a normal glass powder or normal glass fibers having a length under about 0.5 mm with a content of 73% $SiO_2$, 15% $Na_2O$, and 12% CaO. The aluminosilicate powder is to preferably have a composition of 57% $SiO_2$, 20% $Al_2O_3$, 4% $B_2O_3$, 5% CaO, and 12% MgO. Suitable borosilicate glass powder comprises a starting product of from about 70 to 80 percent $SiO_2$, from about 2 to 7 percent $Al_2O_3$, and from about 7 to 13 percent $B_2O_3$.

Furthermore, there may be added as adjuvants wetting agents, in particular, and preferably non-ionic surfactants, namely, fluorinated alkyl esters, and/or silicone oils, as well as deaeration agents, special preference being given to inert polyacrylates incompatible with component (a) in finely dispersed form, and also leveling agents, such as silicones.

The sealants according to the invention may contain also flame retardant agents, such as chlorine and/or bromine compounds, for example, chloroparaffins with a chlorine content of from about 40 to 70 percent by weight, hexabromocyclododecatriene, and/or a phosphoric acid ester, preferably diphenyl cresyl phosphate, trichloroethyl phosphate, or trioctyl phosphate, in a quantity of from about 4 to 12 percent by weight, based upon the total weight of components (a), (b), and (c).

Lastly, the sealants may also contain pigments and/or dyes. Especially suitable as pigments are white pigments, such as magnesium titanate ($MgTiO_3$) and/or titanium dioxide ($TiO_2$) of the anatase type, and also yellow pigments, such as chrome oxide yellow, and/or transparent yellow dyes, which may be used in quantities of from about 1 to 15 percent by weight, preferably from about 7 to 10 percent by weight, based upon the weight of component (a). Since the pigments reflect ultraviolet light, the additional use of at least one light-conducting filler, as mentioned above, is necessary because otherwise hardening cannot occur. In this connection it is especially important that the volumetric quantity of the light-conducting fillers is from five times to at least one third of the quantity by volume of the pigments. The grain size of the pigments is on the order of from about 5 to 100 $\mu$m, and that of the light-conducting filler is in the range of from about 0.5 to 100 m.

The grain size and also the surface characteristics of the pigments and of the light-conducting fillers may affect the viscosity of the sealing compound. Thus, for proper processing, such as application or installation, of the sealant, the viscosity should be in the range of from about 900 to 3000, preferably from about 1200 to 2500 cP, by appropriate selection of the unsaturated polyesters and of the plasticizers and of the quantity of the crosslinking agent.

Another aspect of the invention concerns the preparation of the sealants. The preparation is characterized in that first the isocyanate groups of a prepolymer comprising free isocyanate groups, consisting of an aliphatic or aromatic di- or tri-isocyanate and a long-chain diol with at least 5 carbon atoms in the molecule and/or a polyol, is reacted with a polyol, polyether polyol, amine, polyamine, and/or caprolactone acrylate to form an isocyanate group-free polyurethane. The polyurethane is then dissolved in the crosslinking agent, and in this solution the unsaturated polyester resin and the light initiator are dissolved, adjuvants and/or pigments and/or dyes optionally being added.

When the prepolymer comprising isocyanate groups is reacted with an amine, particularly with a polyamine, it has been found to be especially advantageous to dissolve the amine or polyamine in a part of the crosslinking agent before addition of the latter and to react the resulting solution with the prepolymer to polyurethane.

For the production of especially elastic sealants, it is very advantageous to use as polyol, for the saturation of the free isocyanate groups of the prepolymer, a polybutadiene having free hydroxyl groups which comprises unsaturations as well. These unsaturations can, in the presence of a light initiator, also react with the crosslinking agent, so that highly crosslinked sealants are obtained.

When butadiene-styrene copolymers are used instead of polyurethane, or in admixture with polyurethane, vinyl toluene, which can replace styrene at least in part, is preferably used as crosslinking agent.

To increase the tensile and/or ultimate tensile strength of the sealants according to the invention, fibers of glass, polyacrylic nitrile, and/or polyester may be embedded into the sealants. Also, non-woven and woven textiles made from these materials may be used as reinforcing agents.

The invention also concerns the use of sealants according to the invention for sealing of buildings, roofs, terraces, or balconies, for foundation sealing of structures, and as jointing, patching, and knifing compounds. The sealants are especially useful for sealing buildings or other facilities against water and moisture, atmospheric influences, or aggressive or corrosive media. The sealants would be applied in conventional manner.

The following examples are intended to illustrate the invention and should not be construed as limiting the invention thereto.

EXAMPLES

Example 1

One mol of a prepolymer of diphenylmethane diisocyanate and polytetramethylene ether glycol of molecular weight 1000 with a content of 7 to 9 percent free isocyanate groups is reacted with 0.8 mol of polytetramethylene ether glycol of the molecular weight range of 650 to 2000 in the presence of dibutyl-tin dilaurate as reaction accelerator. The residual content of isocyanate groups having been tested, the final saturation is carried out with about 0.05 to 0.1 mol of polytetramethylene ether glycol of molecular weight 650 to 2000.

To 350 gm of this polyurethane 500 gm of styrene are aded, the mixture being stirred until complete dissolution has taken place. One thousand grams of an unsaturated polyester based upon adipic acid and neopentyl glycol containing 0.25 molar maleic acid anhydride and 40 gm of 2,4,6-trimethylbenzoyl-diphenyl phosphinoxide, are added to the solution.

The resulting compound, stored away from light, is stable for at least six months if the styrene has been stabilized (phlegmatized) with 0.02 percent by weight of butyl catechol.

If the sealing compound is applied as terrace sealant in diffused daylight, it hardens completely in 10 to 15 minutes.

Example 2

Three hundred sixty grams of a butadiene-styrene copolymer are dissolved in 800 gm of vinyl toluene. The solution is mixed with 3000 gm of the unsaturated polyester mentioned in Example 1 (in which the maleic acid anhydride component has been replaced by fumaric acid) in 400 gm of a styrene-vinyltoluene mixture (weight ratio 2:1) stabilized with 0.02 weight percent of hydroquinone and 80 gm of 2-hydroxy-2-methyl-1-phenyl-propan-1-one as light initiator. After thorough mixing 100 gm of highly dispersed silicic acid as anti-settling, dulling, and thickening agent, 40 gm of polyethylene wax as skin-forming agent, and 20 gm of fluorinated alkyl ester as wetting agent, are added.

A sealant for porches and flat roofs which hardens in diffused daylight in 5 to 10 minutes is obtained.

Example 3

From a commercially available mixture of 2,4- and 2,6-toluylene diisocyanate and a polytetramethylene ether glycol of molecular weight of 950 to 2000, a prepolymer containing about 12 percent free isocyanate groups is prepared, dibutyl-tin dilaurate also being used as reaction acelerator. The prepolymer is dissolved in styrene and allowed to react with polybutadiene having free hydroxyl groups (60% 1,4-trans-, 20% 1,4-cis-, and 20% vinyl configuration), until free isocyanate groups were no longer detectable.

Then, 300 gm of the resulting solution having a polyurethane content of 70% is mixed with 2000 gm of an unsaturated polyester resin consisting of adipic acid and maleic acid anhydride in a ratio of 3:1, based upon the carboxyl groups, and with neopentyl glycol and an additional 790 gm of styrene. After thorough mixing, 100 gm of magnesium titanate ($MgTiO_3$) and 200 gm of talcum (substantially free from iron and other heavy metal compounds) as well as 100 gm of highly dispersed silicic acid and 50 gm of polyethylene wax, are added. The resulting mixture is after-treated in a vacuum mixer to remove residual amounts of $CO_2$ from the polyurethane solution. Thereafter, 80 gm of a light initiator mixture (60 gm of 2,6-dimethoxybenzoyl-diphenyl phosphinoxide and 20 gm of benzil dimethyl ketal) are stirred in. The mixture is compounded with 0.05 percent by weight of hydroquinone, based upon the weight of the crosslinking agent, and filled into tubes and cartridges. The tube or cartridge contents serve to seal joints between tiles or interstices on structures and walls.

Example 4

One mol of a prepolymer of isophorone diisocyanate with 1,4-butanediol containing 15 to 17 percent free isocyanate groups and having a mean molecular weight of 250 is reacted with 0.7 mol of polytetramethylene ether glycol of molecular weight 950 to 1000 in the presence of dibutyl-tin dilaurate as reaction accelerator in 60% solution in styrene. After testing the residual content of isocyanate groups, saturation of the free isocyanate groups with the necessary quantity of amine (H equivalent weight 120 to 200), 20% in styrene, is carried out.

To 1000 gm of this solution are added 3000 gm of an unsaturated polyester resin based upon adipic acid and neopentyl glycol with a content of 0.33 molar maleic acid anhydride, 75% dissolved in styrene. Then, 20 gm of 2,4,6-trimethylbenzoylphenyl phosphinic acid methyl ester, 20 gm of 2,6-dichlorobenzoyldiphenyl phosphinoxide, 10 gm of 2-hydroxy-2-methyl-1-phenyl-propan-1-one, and 15 gm of benzil dimethyl ketal as light initiators, are added.

After addition of 600 gm of aluminum hydroxide, 50 gm of paraffin (m.p.: 62° C.), 48 gm of bentonite, 200 gm of chloroparaffin (liquid; 70% chlorine content), 280 gm of hexabromocyclodecatriene, 1.2 gm of silicone oil, 3 gm of polyacrylic acid ester as deaeration agent, and 0.4 gm of 4-tert.butyl pyrocatechine, the mixture is homogenized in a vacuum mixer for about 20 minutes.

A sealant having a viscosity fo 1400 cP, which by diffused daylight and also under direct solar irradiation hardens fully in 10 to 20 minutes in the temperature range of from −12° C. to +35° C. in layer thicknesses up to 6 mm, is obtained. This sealant is suitable, with the simultaneous use of a mat of polyester fibers as reinforcing material, for the sealing of flat roofs and buildings against water and moisture, in particular, if the sealing agent must meet high requirements according to DIN 4102 (resistance to spreading fire and radiant heat).

Example 5

One mol of a prepolymer of toluylene diisocyanate (a commercially available mixture of the 2,4- and 2,6-isomers) and 1,4-butane diol containing about 4% free isocyanate groups and having a mean molecular weight of 1050 is reacted with 0.6 mol of polytetramethylene ether glycol of molecular weight 650 in 65% solution in p-vinyl toluene. At room temperature, the reaction is complete after about six hours. The residual content of free isocyanate groups (about 1.2 to 1.5%) having been tested, saturation of the free isocyanate groups is carried out by addition of caprolactone acrylate (molecular weight 344).

To 800 gm of the resulting solution are added 2800 gm of an unsaturated polyester resin according to Example 4 which is dissolved in a 65% solution of a mixture of one part by weight of p-vinyl toluene and one part by weight of phthalic acid diallyl ester.

Thereafter, 45 gm of 2-hydroxy-2-methyl-1-phenyl-propan-1-one, 25 gm of 2,6-dichlorobenzoyl-diphenyl phosphinoxide, and 20 gm of benzil dimethyl ketal are mixed into complete dissolution.

After addition of 30 gm of paraffin (m.p.: 54° to 62° C.), 50 gm of highly dispersed silicic acid, 1.5 gm of silicone oil, 450 gm of feldspar, 280 gm of glassfiber powder, and 0.2 gm of n-butyl catechol, the total mass is deaerated in a vacuum kneader and subsequently homogenized in a cone mill. The resulting sealant has a flame point above 55° C. and is safe to handle. It serves to seal terraces and flat roofs.

The sealant may also be filled into buckets, tubes, and cartridges and be used as joint sealant. Under exclusion of light, the sealing compound is stable for at least six months. In daylight, the sealant hardens within 15 minutes and retains its elasticity at temperatures as low as −35° C.

The preceding specific embodiments are illustrative of the practice of the invention. It is to be understood, however, that other expedients known to those skilled in the art or disclosed herein, may be employed without departing from the spirit of the invention or the scope of the appended claims.

I claim:

1. An elastic sealant composition comprising ($a_1$) unsaturated polyester resin and ($a_2$) a crosslinking agent for the unsaturated polyester resin comprising at least one compound selected from the group consisting of aromatic vinyl compounds and aliphatic vinyl compounds, said crosslinking agent ($a_2$) being present in a quantity of about 25 to 75 percent by weight, based upon the weight of the unsaturated polyester resin ($a_1$); (b) 2-hydroxy-2-methyl-1-phenyl-propan-1-one, an acryl phosphinoxide compound, or 2-hydroxy-2-methyl-1-phenyl-propan-1-one and an acyl phosphinoxide compound, the weight ratio of components ($a_1$) plus ($a_2$) to component (b) being from about 100:0.5 to 100:5; and (c) polyurethanes containing no free isocyanate groups, butadiene-styrene copolymers, a reaction product of a polyurethane comprising free isocyanate groups with a polybutadiene comprising hydroxyl groups, or a mixture of two or more thereof, the polyurethanes being present in an amount of from about 4 to 45 percent by weight, the butadiene-styrene copolymers being present in an amount of from about 4 to 12 percent by weight, and the reaction products of a polyurethane comprising free isocyanate groups with a polybutadiene comprising hydroxyl groups being present in an amount of from about 5 to 15 percent by weight, each based upon the weight of components ($a_1$) plus ($a_2$), wherein, in the preparation of the polyurethanes, (i) the isocyanate groups of prepolymer comprising free isocyanate groups resulting from the reaction of an aliphatic or aromatic diisocyanate with a long-chain diol, a polyol, or a long-chain diol and a polyol, are reacted with a polyol, polyether polyol, amine, polyamine, caprolactone acrylate, or a mixture thereof to form a polyurethane free of isocyanate groups, (ii) the polyurethane from step (i) is dissolved in the at least a portion of cross-linking agent ($a_2$), and (iii) components ($a_1$) plus any remaining ($a_2$) and (b) are dissolved in the solution from step (ii).

2. A process for the preparation of the elastic sealant composition of claim 1, wherein (i) the isocyanate groups of a prepolymer comprising free isocyanate groups resulting from the reaction of an aliphatic or aromatic diisocyanate with a long-chain diol, a polyol, or a long-chain diol and a polyol, are reacted with a polyol, polyether polyol, amine, polyamine, caprolactone acrylate, or a mixture thereof to form a polyurethane free of isocyanate groups, (ii) the polyurethane from step (i) is dissolved in at least a portion of cross-linking agent ($a_2$), and (iii) components ($a_1$) plus any remaining ($a_2$) and (b) are dissolved in the solution from step (ii).

3. The process of claim 2, wherein the amine, the polyamine, or the amine and polyamine are dissolved in a part of the quantity of crosslinking agent to be employed, and the resulting solution is reacted with the prepolymer to form polyurethane.

4. The process of claim 2, wherein a polybutadiene comprising free hydroxyl groups is used as polyol.

5. The process of claim 3, wherein adjuvants, pigments, or dyes are also present.

6. An elastic composition prepared by the process wherein (1) a prepolymer comprising free isocyanate groups and resulting from the reaction of an aliphatic or aromatic diisocyanate and a long-chain diol, a long-chain polyol, or a long-chain diol and a long-chain polyol, is reacted with a polyol, polyetherpolyol, amine, polyamine, caprolatone acrylate, or a mixture thereof to form a polyurethane free of isocyanate groups, (2) the resulting polyurethane is dissolved in a crosslinking agent selected from the group consisting of hexane diolacrylate, trimethylol propane triacrylate, tripropylene glycol diacrylate, triethylene glycol dimethacrylate, styrene, and vinyl toluene to form a solution thereof, and (3) unsaturated polyester resins comprising the reaction product of dicarboxylic acids selected from the group consisting of malic acid, maleic acid anhydride, fumaric acid, chloromaleic acid, itaconic acid, citraconic acid, phthalic acid, phthalic acid anhydride, isophthalic acid, terephthalic acid, succinic acid, adipic acid, sebacic acid, or pimelic acid reacted with glycols selected from the group consisting of ethylene glycol, propylene glycol, 1,3-butylene glycol, butenediol-1,4, and neopentyl glycol and light initiator selected from the group consisting of 2-hydroxy-2-methyl-1-phenyl-propan-1-one and 2,4,5-trimethylbenzoyldiphenyl phosphinoxide, 2,6-dimethoxybenzoyl-diphenyl phosphinoxide, 2-6 dichlorobenzoyl-diphenyl phosphinoxide, 2,3,5,6-tetramethylbenzoyl-diphenyl phosphinoxide, and 2,4,6-trimethylbenzoyl-phenyl phosphinic acid methyl ester are dissolved in said solution from step (2) to form the elastic sealant composition.

7. In a process for sealing structures, roofs, terraces, porches, or foundations in which a sealant composition is applied to a surface to be sealed and permitted to harden, the improvement which comprises applying an elastic sealent composition comprising ($a_1$) unsaturated polyester resin and ($a_2$) a crosslinking agent for the unsaturated polyester resin comprising at least one compound selected from the group consisting of aromatic vinyl compounds and aliphatic vinyl compounds, said crosslinking agent being present in a quantity of about 25 to 75 perent by weight, based upon the weight of the unsaturated polyester resin;

(b) 2-hydroxy-2-methyl-1-phenyl-propan-1-one, an acyl phosphinoxide compound, or 2-hydroxy-2-methyl-1-phenyl-propan-1-one and an acyl phosphinoxide compound, the weight ratio of components ($a_1$) plus ($a_2$) to component (b) being from about 100:0.5 to 100:5; and (c) polyurethanes containing no free isocyanate groups butadiene-styrene copolymers, a reaction product of a polyurethane comprising free isocyanate groups with a polybutadiene comprising hydroxyl groups, or a mixture of two or more thereof, the polyurethanes being present in an amount of from about 4 to 45 percent by weight, the butadiene-styrene copolymers being present in an amount of from about 4 to 12 percent by weight, and the reaction products of a polyurethane comprising free isocyanate groups with a polybutadiene comprising hydroxyl groups being present in an amount of from ahout 5 to 15 percent by weight, each based upon the weight of components ($a_1$) plus ($a_2$).

* * * * *

UNITED STATES PATENT AND TRADEMARK OFFICE
CERTIFICATE OF CORRECTION

PATENT NO. : 4,778,831

DATED : October 18, 1988

INVENTOR(S) : HEINZ B. KEMPER

It is certified that error appears in the above-identified patent and that said Letters Patent is hereby corrected as shown below:

Column 7, line 5, "aded" should read -- added --.

Column 8, line 30, "fo" should read -- of --

Column 10, Claim 6, line 12, "caprolatone" should read -- caprolactone --.

Column 10, Claim 6, line 31, "2-6" should read -- 2,6- --.

Column 10, Claim 7, line 55, "groups" should read -- groups, --.

Column 10, Claim 7, line 65, "ahout" should read -- about --.

Signed and Sealed this

Twenty-first Day of March, 1989

*Attest:*

DONALD J. QUIGG

*Attesting Officer*  *Commissioner of Patents and Trademarks*